FIG. I.

3,356,119
FISHBONE SEPARATOR
Edwin C. Kirkpatrick, San Pedro, Calif., Clyde W. Neely, deceased, late of Lakewood, Calif., by Doris Francis Neely, executrix, Hazelbrook, Lakewood, Calif., assignors to Ralston Purina Company, St. Louis, Mo., a corporation of Missouri
Filed Aug. 13, 1965, Ser. No. 479,672
5 Claims. (Cl. 146—174)

ABSTRACT OF THE DISCLOSURE

An open-ended perforated rotatable drum is tangentially engaged in substantial rolling contact at a first inlet compression region by a first rotating cylinder having an imperforate resilient surface. Here the tangential movement is downward. Blood meat of fish such as tuna, including bones, is gravitationally fed to said inlet region where it is squeezed a first time. Most of the blood meat is selectively pressed through the perforations into the drum but the bones are retained in adhered relation to the outer surface of the perforated element together with a minor portion of the meat. The admitted meat is upgraded as to appearance.

The perforated drum is engaged by a second rotating cylinder having a resilient surface in upward substantial rolling contact at a second compression region. The blood meat and bone pieces adhering to the perforated drum are again squeezed to upgrade and force more meat into the perforated drum. A doctor blade engages the perforated drum above and beyond said second region to scrape from the perforated drum any remaining material which adhered to it. The arrangement is such that material which is scraped from the perforated member will fall down upon the second cylinder which rotates in a direction away from the perforated drum so as to carry away from the drum the material which is scraped off.

---

Among the several objects of the invention may be noted the provision of apparatus for rapidly removing bones which exist in certain more or less comminuted and heterogeneously colored flesh (sometimes called blood meat) of fish such as tuna after viscera, heads, tails, larger bones and more select chunks of flesh have been removed; the provision of apparatus of the class described which, in addition to efficiently separating bones, will upgrade the blood meat by forming it into more evenly colored lumps which are more desirable for consumption than the blood meat in its heterogeneous form; the provision of continuous-feed apparatus which may be conveniently organized with other continuously operative machine line equipment for processing fish; and the provision of low-cost apparatus of the class described which reduces labor costs. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a side view of apparatus made according to the invention, parts being broken away;

FIG. 5 is a cross-sectional detail section taken on line 5—5 of FIG. 1.

Corresponding reference characters indicate corresponding parts throughout the several views of the drawings.

Tuna fish, which includes the albacore, skipjack, bluefin, yellowfin and other species, are comparatively large. They and similar fish have a system of larger bones which after evisceration, cooking and removal of the skin, heads and tails may be fairly conveniently removed by hand, along with the larger, superior-quality chunks of flesh heretofore preferred for human consumption. After such removal there remains a conglomerate of smaller rib and like bones and particles of light and dark flesh called blood meat. From this the rib and other small bones were hand picked at considerable cost involving risks of contamination. The resulting product was in demand primarily for use in the preparation of animal foods, as for example cat food. The present invention upgrades such blood meat to a form that it has more appeal to animals and is, moreover, acceptable for human consumption.

Figure 1:
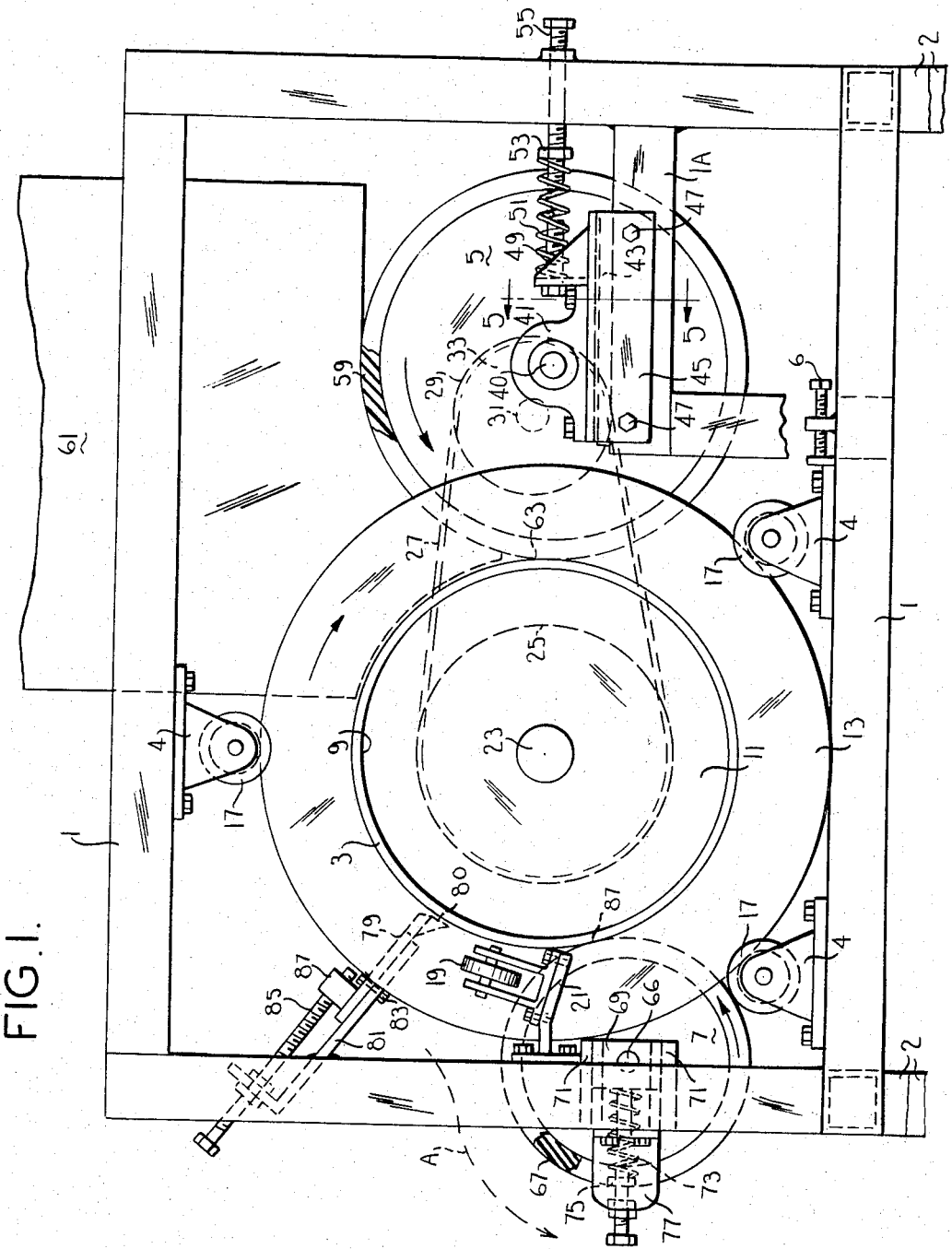
Figure 2:
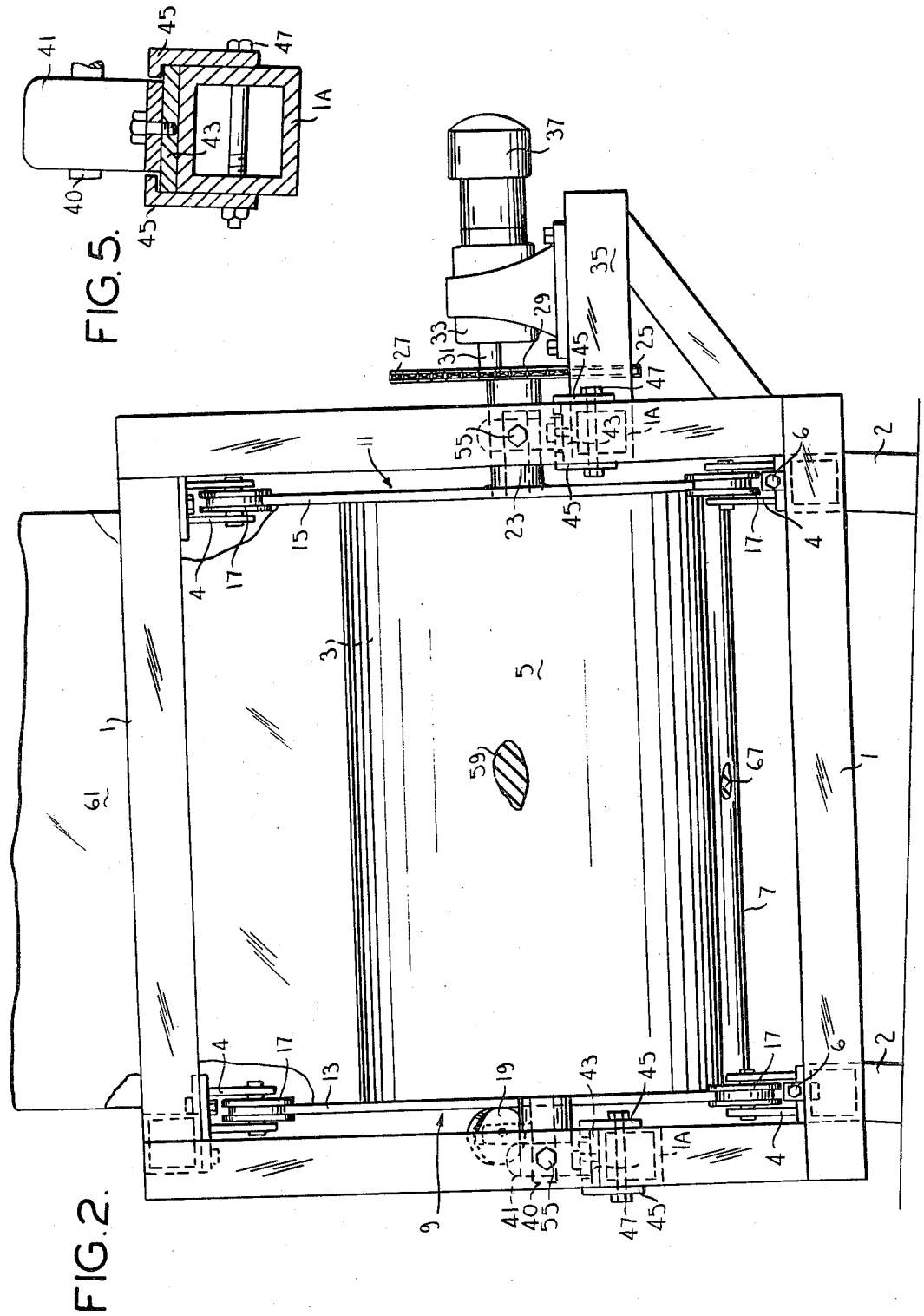
FIG. 2 is a right side elevation of FIG. 1, parts being broken away.
Figure 3:
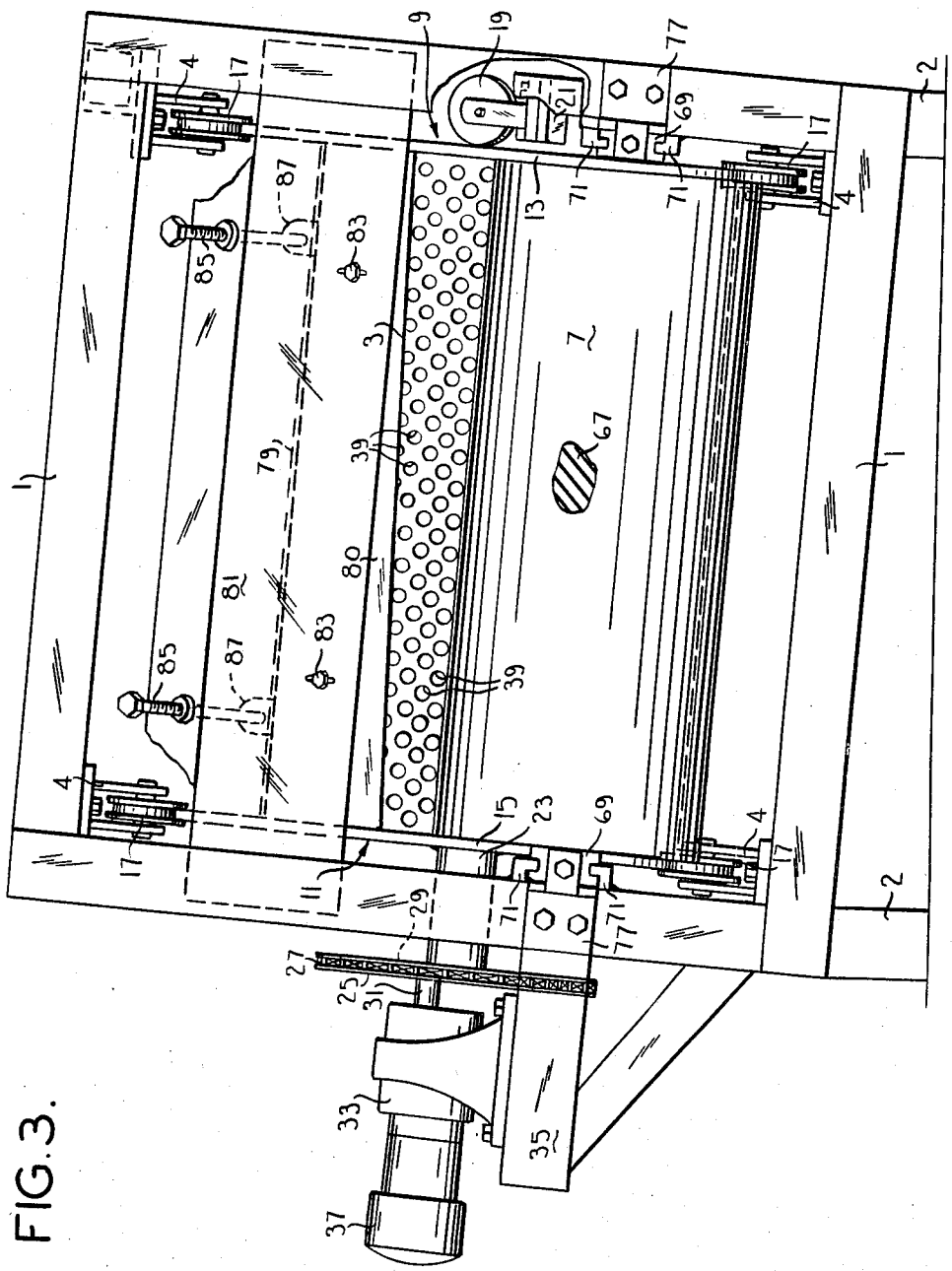
FIG. 3 is a left side elevation of FIG. 1, parts being broken away.

Referring now more particularly to FIG. 1, there is shown at numeral 1 a framework for supporting a rotatable preforated steel drum 3, a primary friction-driven compression drum 5 and an auxiliary friction-driven compression drum 7. As shown in FIGS. 2 and 3, the framework 1 is mounted on supports 2, so that the framework is tilted downward from back to front. The drum 3 is open at its front end, as shown at 9, and closed at its rear end, as shown at 11. Any material tumbled in the drum will advance to and fall out of the lower open end 9. Drum 3 is provided with radial flanges 13 and 15 at its open and closed ends, respectively. Each flange 13 and 15 is supported by a set of three preferably grooved rollers 17, suitably attached to the framework 1 by bearing blocks 4, a front and back pair of which are slidably adjustable on the frame by screws 6 to take up wear as required. The flanges 13 and 15 are supported in the grooves of the rollers 17. If desired, the grooves may be omitted, but in either event it is desirable to have the front flange 13 bear against a roller 19 which is supported by bracket 21 on the framework 1. This roller reacts against downward gravitational thrust of the drum, caused by its tilt.

Figure 4:
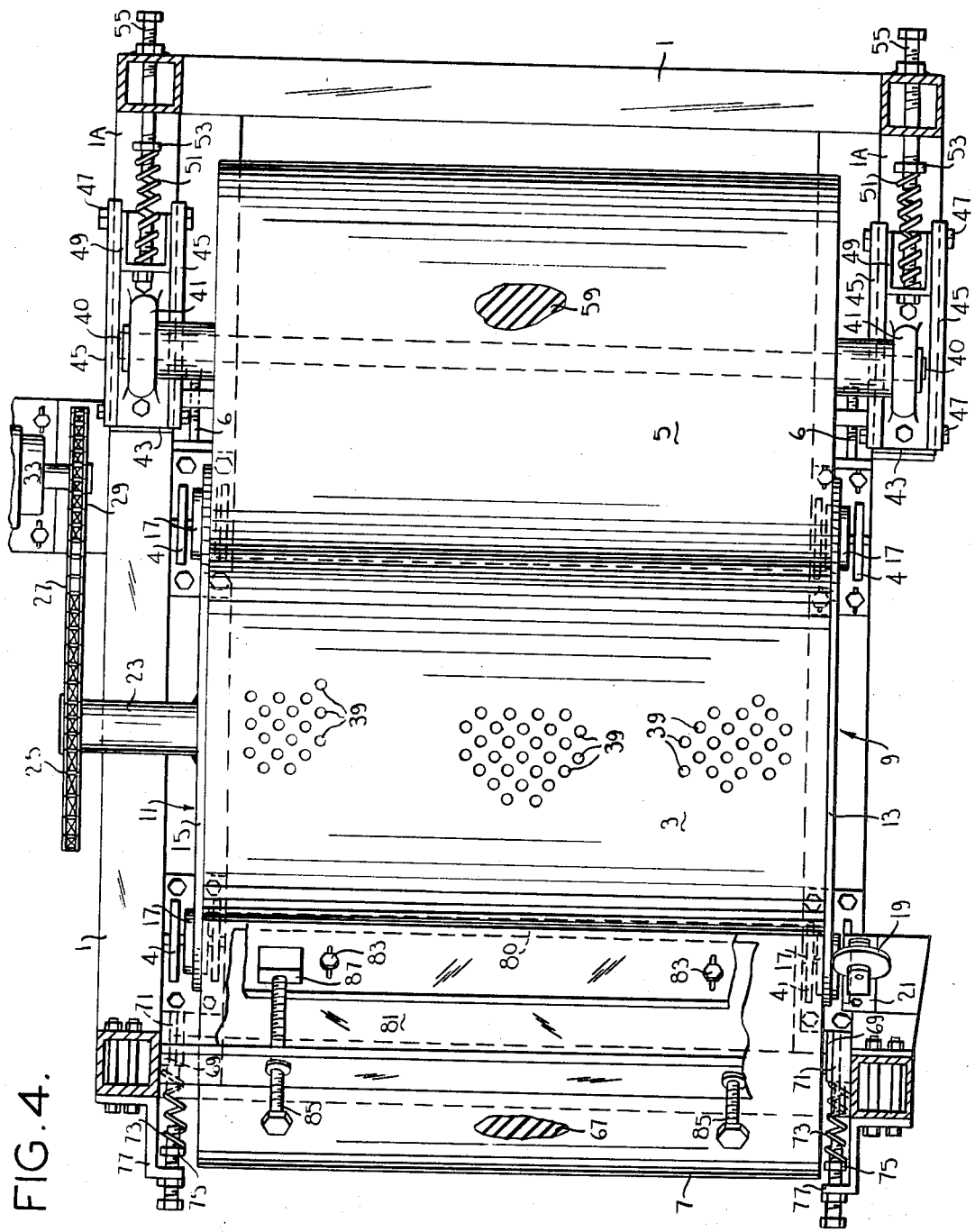
FIG. 4 is a plan view of FIG. 1, parts being broken away including omission of a chute otherwise shown in FIGS. 1–3.

Extending from the closed rear end 11 of the drum 3 is a stub shaft 23. This carries a sprocket 25 driven from a chain 27, the latter being driven by a sprocket 29 on the shaft 31 of a speed reducer 33. The speed reducer 33 is adjustably mounted on a bracket 35 extending from the framework 1 and is driven by an integrally mounted motor 37. The arrangement is such that the drum rotates on the order of 25–30 r.p.m. when driven by a conventional motor. The array of perforations through the drum are indicated at 39 and will be understood to extend over substantially its entire cylindrical surface. The perforations may be of any suitable shape but we have found that circular perforations of ⅝ inch diameter spaced on ¾ inch centers in a drum having a wall thickness of ⅜ inch, arranged in staggered rows as shown on FIGS. 3 and 4, are satisfactory. Circular perforations are preferable because of the ease with which they may be fabricated. Square openings have also been found satisfactory, although they are more difficult to make. They are not shown in the drawings. It will be understood that other perforation diameters and spacings may be employed and that those on FIGS. 3 and 4 are simply diagrammatically indicated and represent any diameters and spacings that may be found to be satisfactory for the particular boney meat to be handled.

Drum 5 is mounted on gudgeons 40 rotatable in bearings 41 which are attached to flat carriages 43 which slide on a part 1A of the framework 1, being guided by overhanging side plates 45 bolted to 1A at 47. Each carriage 43 carries a buttress 49 for seating one end of a spring 51. The other end of each spring 51 reacts against a seat 53 on the end of an adjustment screw 55 threaded through part of the framework 1. By this means the imperforate surface of the drum 5 may be pressed against the perforated surface of the drum 3 at any desired pressure, as determined by the adjusted compression of springs 51.

The imperforate surface of drum 5 is preferably resilient. Resilience is obtained by facing the drum with an appropriate layer 59 of resilient material such as natural or artificial rubber or the like. Supported on the framework 1 above the drums 5 and 3 is a chute 61 to which blood meat containing bones is brought by conveyor (not shown) and fed to the upper surfaces of the drums 3 and 5.

The auxiliary drum 7, also preferably has a resilient facing 67, like facing 59 on drum 5. It will be understood that while this auxiliary drum is preferred, it is not always necessary. Drum 5 is mounted on gudgeons 66, carried in sliding bearings 69. The bearings 69 slide in guides 71, fastened to the framework 1. A spring 73 reacts between each bearing 69 and an adjustable seat 75, screw-mounted in a bracket 77. By this means the auxiliary drum 75 has its resilient surface biased into pressurized contact with the perforated surface of the drum 3.

At numeral 79 is shown a scraper or doctor blade, the lower end 80 of which is in close juxtaposition to the surface of the perforated drum 3 and extending lengthwise at a small angle with respect to its axis of rotation (see FIG. 3). This blade is slidably carried on a platen 81 fastened to the framework 1. The blade is held in adjusted position by bolts 83 which may be loosened to permit adjustment. Adjusting screws 85, threaded into parts 87 carried on the blade 79, serve to adjust the blade 79 into scraping position.

Operation is as follows:

The so-called blood meat with contained bones is delivered to the chute 61. This includes the various light and dark colors of meat or flesh, various particle sizes and bones. The direction of rotation of the drums is as shown by the arrows in FIG. 1. At the tangent point 63 the material is squeezed between the rolls. Immediately it is broken down to form a blend of the various colored materials. In passing between the rolls, the surface of the roll 5 pushes most of the squeezed flesh through the openings 39 which do not accept the bones. The bones then pass through the compression region between rolls 3 and 5 and may drop away. Some flesh and bones may adhere to the surface of the drum 3 between perforations 39. These are carried around and up to the point of tangency 87 between the drums 3 and 7. Here a second squeezing action by roll 7 further presses any remaining meat through the perforations 39, leaving practically only bone material and only a small amount of meat, if any, on the surface of the drum 3. The bone material is scraped from the surface of the drum 3 by the doctor blade 79. Stripped material is carried away in the direction shown by the dotted arrow A on FIG. 1.

The material that is squeezed through the perforations is substantially all flesh and becomes formed into chunks of sizes determined by the shapes and sizes of the perforations. This is because the compressed flesh which extrudes through the perforations 39 into the inside of the drum 3 breaks off in short lengths. As the drum rotates these spiral down to its lower open end, where they fall out onto a suitable conveyor (not shown) for delivery to canning apparatus. An appropriate slope on the drum is on the order of 4° from the horizontal.

The preferred perforation sizes and shapes above given result in desirable chunk sizes and forms. These relatively uncontaminated, evenly colored chunks are attractive food for human beings, the blood meat having been upgraded as to sanitary qualities, form and bonelessness. Typical bone content of the finished product is on the order of 0.1% or less. The small content in the product is due only to such small bone harmless fragments as may have passed through the perforations 39. This low bone content is the result of minimized bone breakage. Thus while drums 5 and 7 may be made with nonresilient surfaces, the resilient surfaces above described are preferred to minimize bone breakage, which otherwise might reduce them to sizes which would pass through the perforations 39.

Satisfactory diameters for the drums have been found to be 18 inches for drums 3 and 5, and 12 inches for drum 7. A satisfactory resiliently applied pressure at the points of tangency 63 and 87 has been found to be on the order of 450–700 p.s.i.

While the drive for the apparatus has been shown as applied to the drum 3, the drums 5 and 7 being frictionally driven therefrom, it will be understood that under certain conditions a drive may be applied to one of the drums 5 or 7, both of them, or all three of the drums 3, 5 and 7. It will also be understood that in some cases an auxiliary drum such as 7 may not be required and in other cases additional auxiliary drums may be useful. In any event a blade such as 79 is located beyond the last effective compression region between drums.

While cylindrical chunks are preferred as brought about by the round perforations 39, it will be understood that angular chunks are also sometimes desirable, in which event the square perforations above mentioned would be employed. Other desired polygonal or other shapes may also be employed.

It will be understood that separators of various capacities may be made according to the invention. For each, the efficiency of bone separation will be a function of drum speed and pressure at the points of compression. The best speeds and pressures may be readily ascertained by trial and adjustments made in the output speed of speed changer 33 and adjustments of the spring reaction seats 53 and 75.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for removing bones from and upgrading blood meat or the like of fish, comprising a rotatable perforated first surface, a curved resilient imperforate rotatable second surface directly engaging said perforated first surface in substantial downward rolling contact at a first compression region, means for gravitationally feeding to said first region blood meat of fish including bones, whereby a substantial amount of said meat is squeezed through the perforations of the perforated surface without the bones to upgrade the meat in appearance while some of the meat and the bones remain in adhered relation on the perforated surface as it moves beyond the first compression region, an imperforate rotatable third surface directly engaging said perforated surface in upwardly moving substantially rolling contact at a second compression region, whereby substantially all the additional meat adhering to the perforated surface is squeezed through its perforations and substantially all the bones adhere to said perforated surface as it moves beyond the second compression region, and a doctor blade engaging the perforated surface above and beyond said second compression region to remove therefrom any remaining materials from the perforated surface.

2. Apparatus made according to claim 1 wherein said first, second and third surfaces are all of cylindrical form and the third surface is resilient.

3. Apparatus for removing bones from and upgrading blood meat or the like of fish, comprising a framework, a perforated rotatable element supported on said framework, a pair of imperforate resilient pressure elements adjacent to said perforated element, one of said pressure elements defining with said perforated element a first compression region and the other of said pressure elements defining with said perforated element a second compression region, means for feeding the blood meat of fish including the bones into said first compression region, said one pressure element directly coacting with said perforated element in a downward direction to squeeze most of the blood meat through the perforations thereof in the first compression region, the perforations being sized to inhibit the passage of bones therethrough whereby the bones and the remaining blood meat are carried by said perforated element in adhered relation toward the second compression region, said other pressure element directly coacting with said perforated element in an upward direction to further squeeze the blood meat carried thereby through the perforations thereof in the second compression region while substantially only the bones are carried by said perforated element therefrom, and a doctor blade engaging said perforated element for removing substantially all the material retained thereon after passage through the second compression region.

4. The apparatus according to claim 3 wherein said perforated element has a cylindrical form and includes means for driving said cylindrical form of perforated element, the rotation of said cylindrical element serving to drive said one and the other pressure elements by the contact therewith in the first and second compression regions.

5. The apparatus according to claim 3 wherein said one and the other pressure elements have a cylindrical form and are in rolling contact with said perforated element.

References Cited
UNITED STATES PATENTS

| | | | |
|---|---|---|---|
| 1,094,817 | 4/1914 | Rossi | 146—76 |
| 1,244,774 | 10/1917 | Pointee | 146—174 X |
| 2,172,790 | 9/1939 | Ferrari et al. | 146—174 |
| 2,846,944 | 8/1958 | Willmes et al. | |
| 3,057,387 | 10/1962 | Hyde et al. | 146—174 X |
| 3,122,986 | 3/1964 | Stone | 146—174 X |
| 3,266,542 | 8/1966 | Paoli | 146—76 |

JAMES M. MEISTER, *Primary Examiner.*